(12) United States Patent
Mori (10) Patent No.: US 10,717,333 B2
(45) Date of Patent: Jul. 21, 2020

(54) FRONT TWO-WHEEL SUSPENSION SYSTEM

(71) Applicant: HONDA MOTOR CO., LTD., Tokyo (JP)

(72) Inventor: Yotaro Mori, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 84 days.

(21) Appl. No.: 15/887,054

(22) Filed: Feb. 2, 2018

(65) Prior Publication Data

US 2018/0229564 A1    Aug. 16, 2018

(30) Foreign Application Priority Data

Feb. 10, 2017    (JP) .................................. 2017-023077

(51) Int. Cl.
| | | |
|---|---|---|
| B60G 3/20 | (2006.01) | |
| B60G 3/18 | (2006.01) | |
| B62K 5/08 | (2006.01) | |
| B62K 5/10 | (2013.01) | |
| B60G 7/00 | (2006.01) | |

(Continued)

(52) U.S. Cl.
CPC ............ *B60G 3/207* (2013.01); *B60G 3/185* (2013.01); *B60G 7/008* (2013.01); *B62D 7/14* (2013.01); *B62D 9/00* (2013.01); *B62K 5/05* (2013.01); *B62K 5/08* (2013.01); *B62K 5/10* (2013.01); *B62K 21/18* (2013.01); *B62K 25/24* (2013.01); *B60G 2200/13* (2013.01); *B60G 2204/148* (2013.01); *B60G 2206/50* (2013.01);

(Continued)

(58) Field of Classification Search
CPC ........ B60G 3/207; B60G 7/008; B60G 3/185; B60G 2300/45; B60G 2300/122; B60G 2206/50; B60G 2204/148; B60G 2200/13; B60G 2300/124; B62K 21/18; B62K 5/05; B62K 25/24; B62K 5/10; B62K 5/08; B62D 7/14; B62D 9/00
See application file for complete search history.

(56) References Cited

U.S. PATENT DOCUMENTS

2015/0130145 A1    5/2015    Miyamori

FOREIGN PATENT DOCUMENTS

| EP | 1572526 A1 | 9/2005 |
|---|---|---|
| EP | 1339599 B1 | 5/2012 |

(Continued)

OTHER PUBLICATIONS

European Search Report dated Jul. 24, 2018, 11 pages.

(Continued)

*Primary Examiner* — Paul N Dickson
*Assistant Examiner* — Joselynn Y Sliteris
(74) *Attorney, Agent, or Firm* — Rankin, Hill & Clark LLP (57) ABSTRACT

A front two-wheel suspension system having a pair of left and right front wheels includes: left and right upper kingpin axles that support the left and right front wheels and are pivoted in a yaw direction by a steering shaft; left and right knuckle arms that are coupled to the left and right upper kingpin axles and pivoted in the yaw direction by the steering shaft; left and right upper arms that couple the left and right knuckle arms and left and right cushion units; and left and right first pivots that make the left and right knuckle arms and the left and right upper arms pivotable in the yaw direction. The upper kingpin axles and the first pivots are coaxial.

5 Claims, 5 Drawing Sheets

(51) Int. Cl.
*B62K 5/05* (2013.01)
*B62K 21/18* (2006.01)
*B62K 25/24* (2006.01)
*B62D 7/14* (2006.01)
*B62D 9/00* (2006.01)

(52) U.S. Cl.
CPC .. *B60G 2300/122* (2013.01); *B60G 2300/124* (2013.01); *B60G 2300/45* (2013.01)

(56) References Cited

FOREIGN PATENT DOCUMENTS

| | | |
|---|---|---|
| EP | 2692612 A1 | 2/2014 |
| EP | 2913257 A1 | 9/2015 |
| EP | 3360764 A1 | 8/2018 |
| JP | 2008-132933 A | 6/2008 |
| JP | 2011-195099 A | 10/2011 |
| JP | 2016-147536 | 8/2016 |
| TW | I380922 B | 1/2013 |
| WO | 2010/015986 A1 | 2/2010 |
| WO | 2011/074204 A1 | 6/2011 |
| WO | 2014/098228 A1 | 6/2014 |

OTHER PUBLICATIONS

European Office Action dated Apr. 26, 2019, 8 pages.
Japanese Office Action with English translation dated Jan. 8, 2019, 8 pages.

FRONT TWO-WHEEL SUSPENSION SYSTEM

CROSS-REFERENCE TO RELATED APPLICATION

Priority is claimed on Japanese Patent Application No. 2017-023077, filed on Feb. 10, 2017, the contents of which are incorporated herein by reference.

BACKGROUND

Field of the Invention

The present invention relates to a front two-wheel suspension system.

Background

Conventionally, there is a front two-wheel suspension system that includes: a pair of left and right front wheels; left and right cushion units that damp an external force applied to the pair of left and right front wheels; and a steering shaft that turnably steers a vehicle body. For example, a constitution which includes a pair of left and right arm members that turnably support a pair of left and right front wheels and in which left and right cushion units are disposed in the rear of the pair of left and right front wheels is disclosed in Japanese Unexamined Patent Application, First Publication No. 2016-147536.

SUMMARY

However, when an external force is applied to the front wheels from the ground due to roughness or the like of the ground, a pair of left and right arm members (left and right upper arms and left and right lower arms) are bent, and thus there are problems in that the arm members and bearings need to be increased in size, the front two-wheel suspension system is easily increased in size, and a high cost is required.

An aspect of the present invention is intended to downsize a front two-wheel suspension system in the front two-wheel suspension system having a pair of left and right front wheels.

(1) An aspect of the present invention is a front two-wheel suspension system that includes: a pair of left and right front wheels; left and right cushion units configured to damp an external force applied to the pair of left and right front wheels; and a steering shaft configured to turnably steer a vehicle body, and further includes left and right steering axles configured to support the pair of left and right front wheels and pivoted in a yaw direction by the steering shaft; left and right first link members coupled to the left and right steering axles and pivoted in the yaw direction by the steering shaft; left and right second link members configured to couple the left and right first link members and the left and right cushion units; and left and right first pivots configured to make the left and right first link members and the left and right second link members pivotable in the yaw direction. The steering axles and the first pivots are coaxial.

Here, the yaw direction refers to a rotating direction centered on a vertical axis. That is, the yaw direction refers to a rotating direction about a center line (a vertical line) of an upward/downward direction (in other words, a rotating direction within a horizontal plane). A rotating direction about an axis that intersects to be slightly inclined with respect to the center line of the upward/downward direction is included in the yaw direction. For example, a rotating direction about an axis where an angle formed between the axis and the center line of the upward/downward direction falls within a range of 30 degrees is included in the yaw direction.

(2) In the front two-wheel suspension system, the centers of tread surfaces of the front wheels may be arranged on the same virtual planes as at least one of axes of the steering axles and axes of the cushion units.

(3) The front two-wheel suspension system may further include left and right second pivots configured to make the left and right second link members pivotable in a pitch direction, and the axes of the steering axles, the axes of the cushion units, and axes of the second pivots may be arranged on the same virtual planes.

Here, the pitch direction refers to a rotating direction centered on a left-right axis. That is, the pitch direction refers to a rotating direction about a center line of a vehicle width direction. A rotating direction about an axis that intersects to be slightly inclined with respect to the center line of the vehicle width direction is included in the pitch direction. For example, a rotating direction about an axis where an angle formed between the axis and the center line of the vehicle width direction falls within a range of 30 degrees is included in the pitch direction.

(4) The front two-wheel suspension system may further include: left and right third link members configured to pivotably support the left and right second link members via the left and right second pivots; an oscillation arm configured to couple the left and right third link members in a vehicle width direction; and left and right third pivots configured to make the left and right third link members and outer ends of the oscillation arm in the vehicle width direction pivotable in a roll direction, and axes of the third pivots may be arranged on the virtual planes.

Here, the roll direction refers to a rotating direction centered on a front-rear axis. That is, the roll direction refers to a rotating direction about a center line of a forward/backward direction. A rotating direction about an axis that intersects to be slightly inclined with respect to the center line of the forward/backward direction is included in the roll direction. For example, a rotating direction about an axis where an angle formed between the axis and the center line of the forward/backward direction falls within a range of 30 degrees is included in the roll direction.

(5) In the front two-wheel suspension system, the steering axles may be parallel with the steering shaft.

According to the constitution of (1), the steering axles and the first pivots are coaxial. Thereby, when an external force from the ground is applied to the front wheels, torsional moment generated between the steering axles and the first pivots can be inhibited. For this reason, in comparison with a case in which the steering axles and the first pivots are shifted on different axes, bearings of the steering axles and the first pivots can be downsized. That is, there is no need to make the bearings larger in order to enhance torsional rigidity. Therefore, the front two-wheel suspension system can be downsized. In addition, since it is possible to inhibit the first link members from being made larger, the front two-wheel suspension system is further downsized easily.

According to the constitution of (2), the centers of the tread surfaces of the front wheels are arranged on the same virtual planes as at least one of the axes of the steering axles and the axes of the cushion units. Thereby, since the external force is easily transmitted from the centers of the tread surfaces of the front wheels to the cushion units via the steering axles, moments generated in the roll direction and the yaw direction can be inhibited when the external force is applied to the front wheels. For this reason, in comparison with a case in which the centers of the tread surfaces of the front wheels are arranged on planes different from the axes of the steering axles and the cushion units, the external force can be effectively damped by the cushion units, and the cushion units can be downsized. Therefore, the front two-wheel suspension system is further downsized with ease. In addition, torsional moment generated at the first link members can be inhibited, and thus it is possible to inhibit the first link members from being made larger. Therefore, the front two-wheel suspension system is further downsized easily. In addition, since torsional moment generated in the pivoting directions (the pitch directions) of the second link members can be inhibited, it is possible to inhibit the second link members from being made larger. Therefore, the front two-wheel suspension system is further downsized easily.

According to the constitution of (3), the left and right second pivots that make the left and right second link members pivotable in the pitch directions are further provided, and the axes of the steering axles, the axes of the cushion units, and the axes of the second pivots are arranged on the same virtual planes. Thereby, when the external force is applied to the front wheels, the moments generated in the roll direction and the yaw direction can be inhibited. For this reason, in comparison with a case in which the axes of the steering axles, the axes of the cushion units, and the axes of the second pivots are arranged on different planes, the external force can be effectively damped by the cushion units, and the cushion units can be downsized. Therefore, the front two-wheel suspension system is further downsized easily. In addition, since the torsional moment generated in the pivoting directions (the pitch directions) of the second link members can be inhibited, it is possible to inhibit the second link members from being made larger. Therefore, the front two-wheel suspension system is further downsized easily.

According to the constitution of (4), the left and right third link members that pivotably support the left and right second link members via the left and right second pivots, the oscillation arm that couples the left and right third link members in the vehicle width direction, and the left and right third pivots that make the left and right third link members and the outer ends of the oscillation arm in the vehicle width direction pivotable in the roll direction are further provided, and the axes of the third pivots are arranged on the virtual planes. Thereby, since torsional moment in the roll direction generated at the oscillation arm can be inhibited, the oscillation arm can be downsized. Therefore, the front two-wheel suspension system is further downsized easily.

According to the constitution of (5), the steering axles are parallel with the steering shaft. Thereby, since the front wheels are turned with uniformity with respect to the pivoting of the steering shaft, operability of a vehicle can be improved. In addition, since a link absorbing an angle difference of the steering shaft is not required, the front two-wheel suspension system is further downsized easily.

DESCRIPTION OF THE EMBODIMENTS

Hereinafter, an embodiment of the present invention will be described with reference to the drawings. In the following description, unless otherwise stated, directions of front, rear, left, right, etc. are the same as directions in a vehicle to be described below. Moreover, in suitable places in the drawings used for the following description, an arrow FR indicates a front side of the vehicle, an arrow LH indicates a left side of the vehicle, and an arrow UP indicates an upper side of the vehicle. In addition, in the drawings, a line CL indicates a left-right center line of a vehicle body.

<Overall Vehicle>

Figure 1:
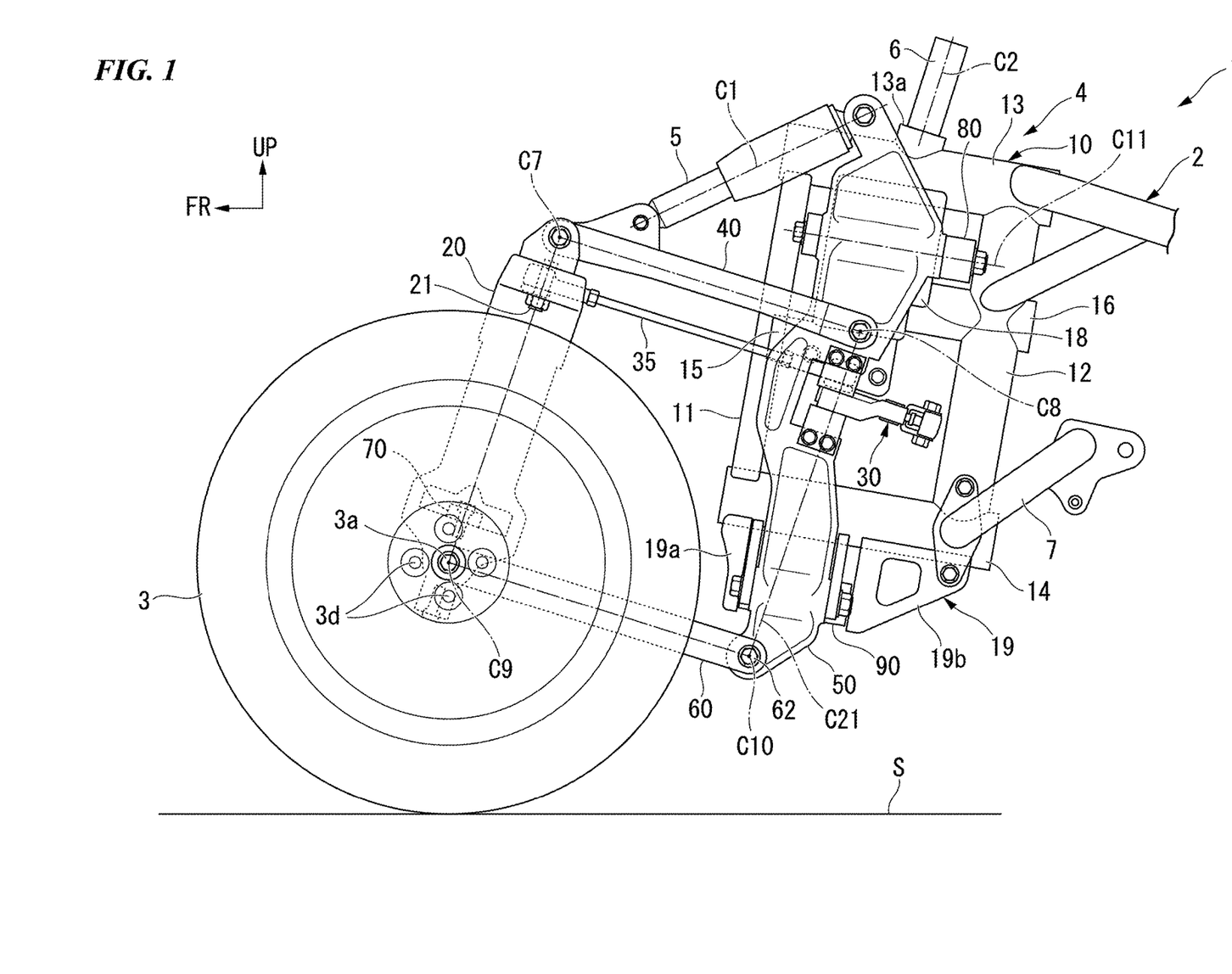
FIG. 1 is a left side view of a front portion of a vehicle body in a saddle-riding type vehicle of a front two-wheel type in an embodiment of the present invention.

FIG. 1 illustrates a front portion of a vehicle body in a saddle-riding type vehicle 1 of the present embodiment. The saddle-riding type vehicle 1 includes front wheels 3 as a pair of left and right steered wheels at a front portion of a vehicle body in left and right symmetry, and a rear wheel (not shown) as a single driving wheel at a rear portion of the vehicle body, and is configured as a three-wheel oscillation type vehicle of a front two-wheel type which enables oscillation (hereinafter referred to as "rolling motion" or "left-right oscillation") of the vehicle body in a roll direction in a state in which the left and right front wheels 3 are set.

In the following description, unless otherwise stated, a constitution when the vehicle is in a straight traveling steering state in which, in a state in which the left and right front wheels 3 are in contact with a horizontal road surface S, in a 1G state in which a load corresponding to vehicle weight is applied to the front two-wheel suspension system 4, and in an upright state in which the vehicle body sets an angle of the left-right oscillation to 0 degrees, a steering angle of the left and right front wheels 3 is 0° will be described. Unless otherwise stated, the constitution to be described below is set to be in left and right symmetry with respect to the left-right center of the vehicle body. In the present embodiment, a pair of left and right constitutions may be distinguished by adding "L" to reference signs of the left side and "R" to reference signs of the right side, or may be indicated only by reference signs not including "L" or "R."

<Front Two-Wheel Suspension System>

As illustrated in FIG. 1, in the saddle-riding type vehicle 1, the front two-wheel suspension system 4 is provided at a front portion of an engine (not shown) mounted in the middle of the vehicle body. The front two-wheel suspension system 4 includes: left and right cushion units 5 that respectively damp an external force applied to the left and right front wheels 3; a steering shaft 6 that turnably steers the vehicle body 2; a front suspension frame body 10 that pivotably supports the steering shaft 6; left and right first link members 20 (hereinafter referred to as "knuckle arms 20") that are pivoted in yaw directions by the steering shaft 6; a steering link mechanism 30 that couples the steering shaft 6 with the left and right first link members 20; left and right second link members 40 (hereinafter referred to as "upper arms 40") that respectively couple the left and right first link members 20 and the left and right cushion units 5; left and right third link members 50 (hereinafter referred to as "side arms 50") that pivotably support the left and right second link members 40 in pitch directions, respectively; left and right lower arms 60 that couple the left and right first link members 20 and the left and right third link members 50 below the left and right second link members 40; left and right leading arms 70 that respectively couple the left and right first link members 20 with the left and right lower arms 60; an oscillation arm 80 (hereinafter referred to as "upper oscillation arm 80") that couples the left and right third link members 50 in a vehicle width direction; and a lower oscillation arm 90 that couples the left and right third link members 50 below the upper oscillation arm 80 in the vehicle width direction.

Figure 2:
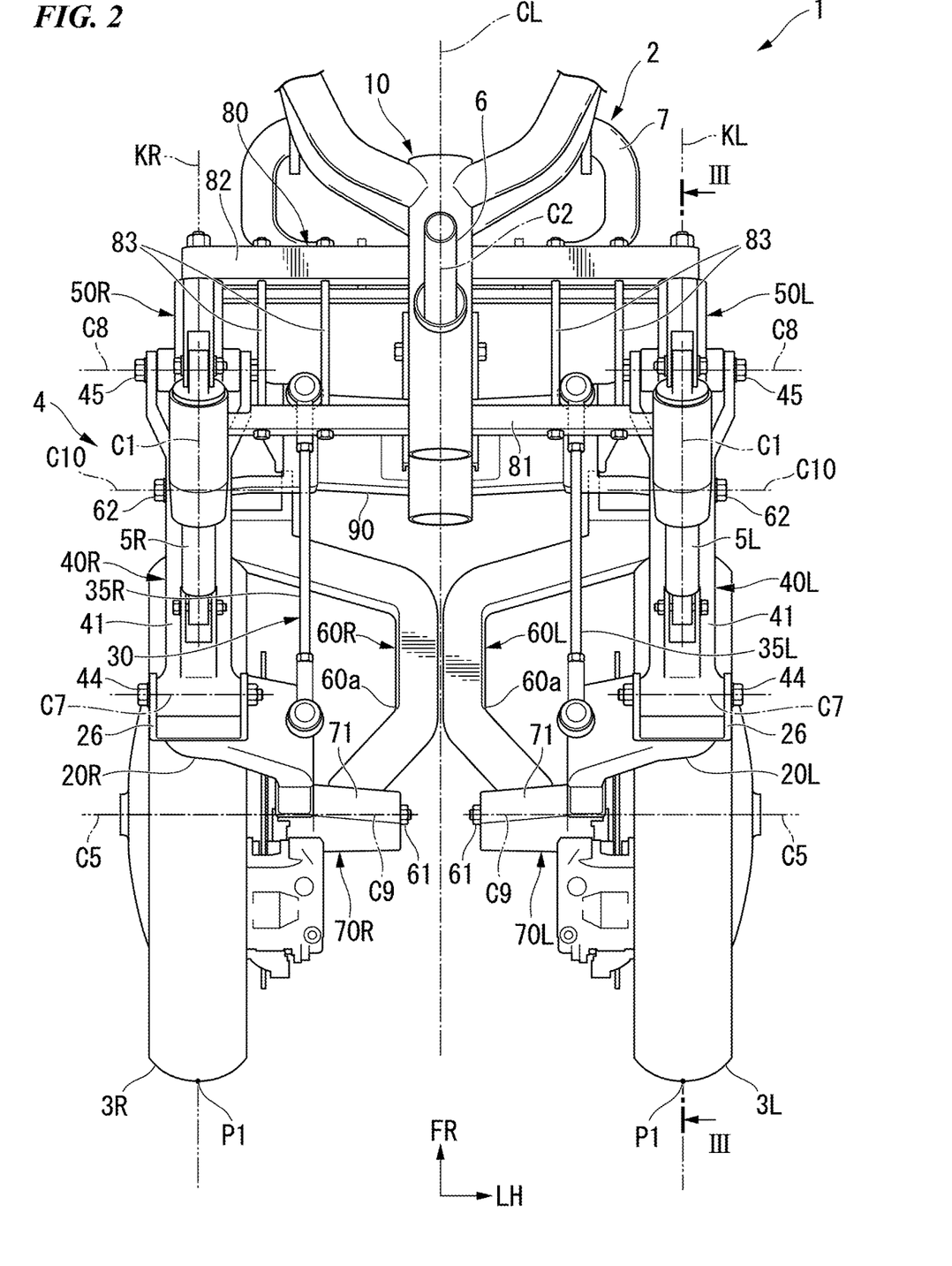
FIG. 2 is a top view of a front two-wheel suspension system of the saddle-riding type vehicle.

As illustrated in FIG. 2, the front two-wheel suspension system 4 sets the vehicle body 2 including the front suspension frame body 10 and the engine to enable left-right oscillation with the left and right front wheels 3L and 3R in contact with the ground, and similarly sets the left and right front wheels 3L and 3R to enable left-right oscillation in conformity with the left-right oscillation of the vehicle body 2. Conversely, the front two-wheel suspension system 4 sets the left and right front wheels 3L and 3R to alternately enable an up-and-down motion relative to the vehicle body 2. The front two-wheel suspension system 4 has a double wishbone mode in which the left and right front wheels 3L and 3R are independently suspended.

<Cushion Units>

In the side view of FIG. 1, the cushion units 5 are disposed in front of the steering shaft 6 and above the front wheels 3. In the side view of FIG. 1, the cushion units 5 extend at an upper rear side of the front wheels 3 roughly in a forward/backward direction. To be specific, in the side view of FIG. 1, the cushion units 5 are inclined with respect to the forward/backward direction such that rear sides thereof are located at the upper side. In the top view of FIG. 2, front portions of the left and right cushion units 5L and 5R are disposed to fall within a left-right width between the left and right front wheels 3L and 3R. In the top view of FIG. 2, axes C1 (hereinafter referred to as "stroke axes C1") of the cushion units 5 extend back and forth in a rectilinear shape.

Figure 3:
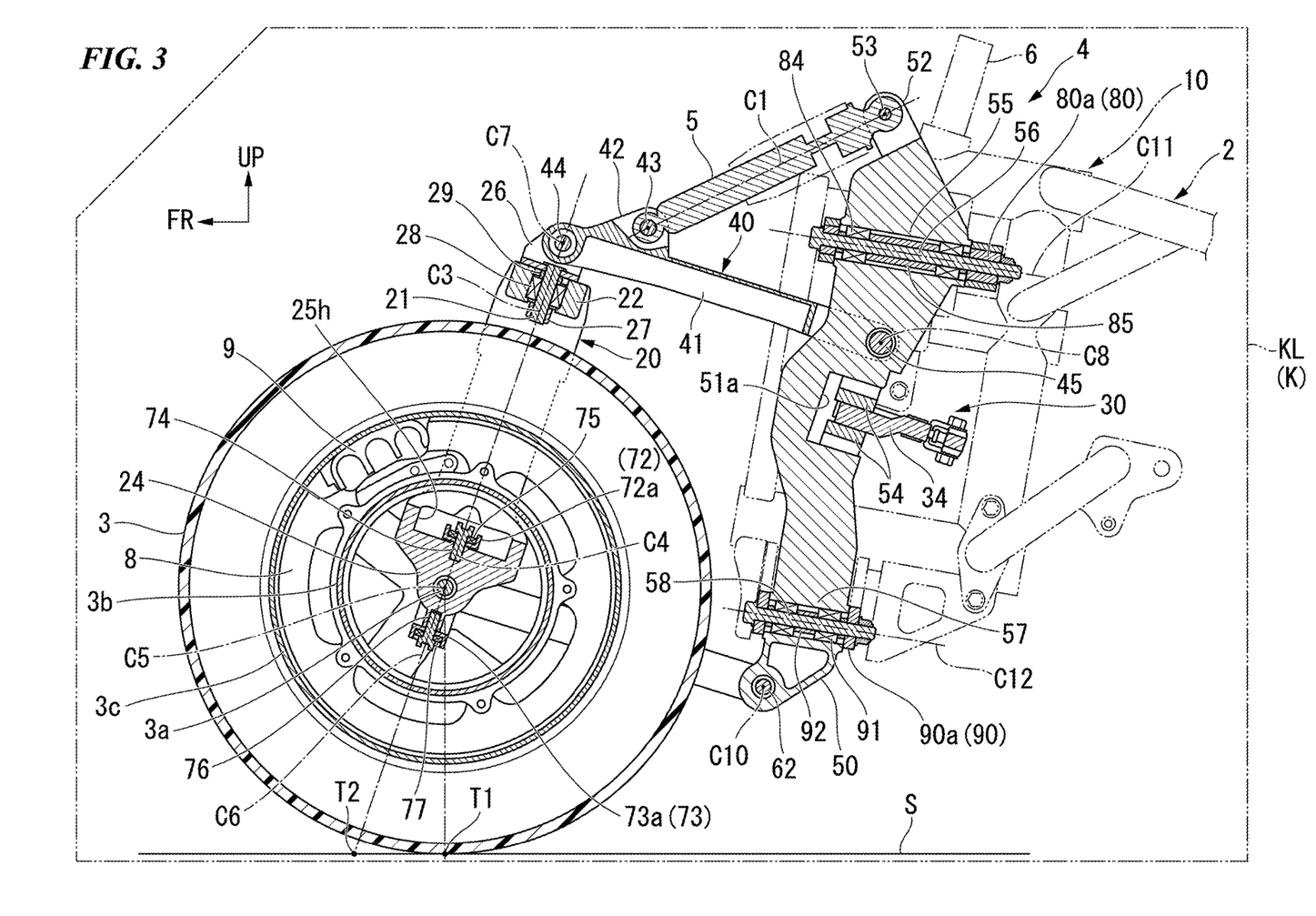
FIG. 3 is a left side view including a cross section taken along line of FIG. 2.

As illustrated in FIG. 3, front ends of the cushion units 5 are pivotably coupled to cushion front supports 42 of the upper arms 40 via cushion front coupling shafts 43 in the pitch directions. Rear ends of the cushion units 5 are pivotably coupled to cushion rear supports 52 of the side arms 50 via cushion rear coupling shafts 53 in the pitch directions. The cushion units 5 perform a stroke between the upper arms 40 and the side arms 50 due to input of a shock to the front wheels 3 or the like, thereby absorbing the shock or the like input to the front wheels 3 and damping the up-and-down motions of the front wheels 3.

<Steering Shaft>

The steering shaft 6 vertically extends in the left-right middle (the middle in the vehicle width direction) of the vehicle body. As illustrated in FIG. 2, an axis C2 (hereinafter referred to as "steering axis C2") of the steering shaft 6 is disposed on the left-right center line CL of the vehicle body. In the side view of FIG. 1, the steering shaft 6 is inclined with respect to an upward/downward direction such that an upper side thereof is located at a rear side. A bar type steering handle (not shown) is mounted at an upper end of the steering shaft 6.

A lower portion of the steering shaft 6 is supported on the front suspension frame body 10 to be pivotable about the steering axis C2.

<Front Suspension Frame Body>

As illustrated in FIG. 1, the front suspension frame body 10 is fixed to a front portion of the engine (not shown) via a mounting frame 7. In the top view of FIG. 2, the front suspension frame body 10 is disposed in the middle of the vehicle width direction. In the side view of FIG. 1, the front suspension frame body 10 is disposed in the rear of the front wheels 3.

In the side view of FIG. 1, the front suspension frame body 10 has a ladder shape that is inclined with respect to the upward/downward direction such that an upper side thereof is located at a rear side. The front suspension frame body 10 includes a front side part 11, a rear side part 12, an upper side part 13, a lower side part 14, a front intermediate part 15, and a rear intermediate part 16 which form the ladder shape.

In the side view of FIG. 1, the front and rear side parts 11 and 12 extend in a rectilinear shape that is inclined with respect to the upward/downward direction such that upper sides thereof are located at a rear side, and are separated back and forth substantially in parallel to each other.

Figure 4:
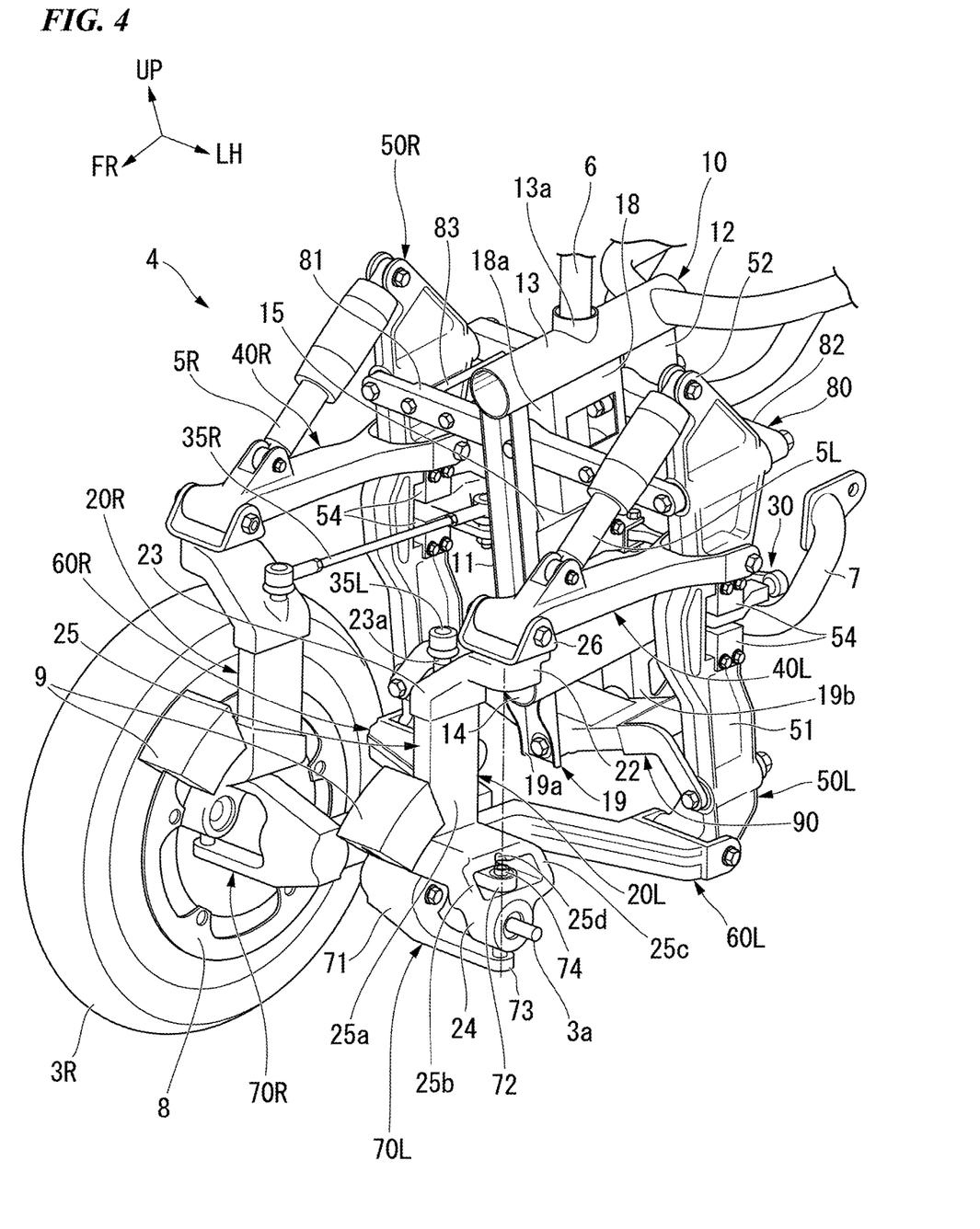
FIG. 4 is a perspective view of the front two-wheel suspension system when viewed from the upper left front side.

As illustrated in FIG. 4, the front side part 11 has a plate shape that has a U-shaped cross section that opens forward.

Figure 5:
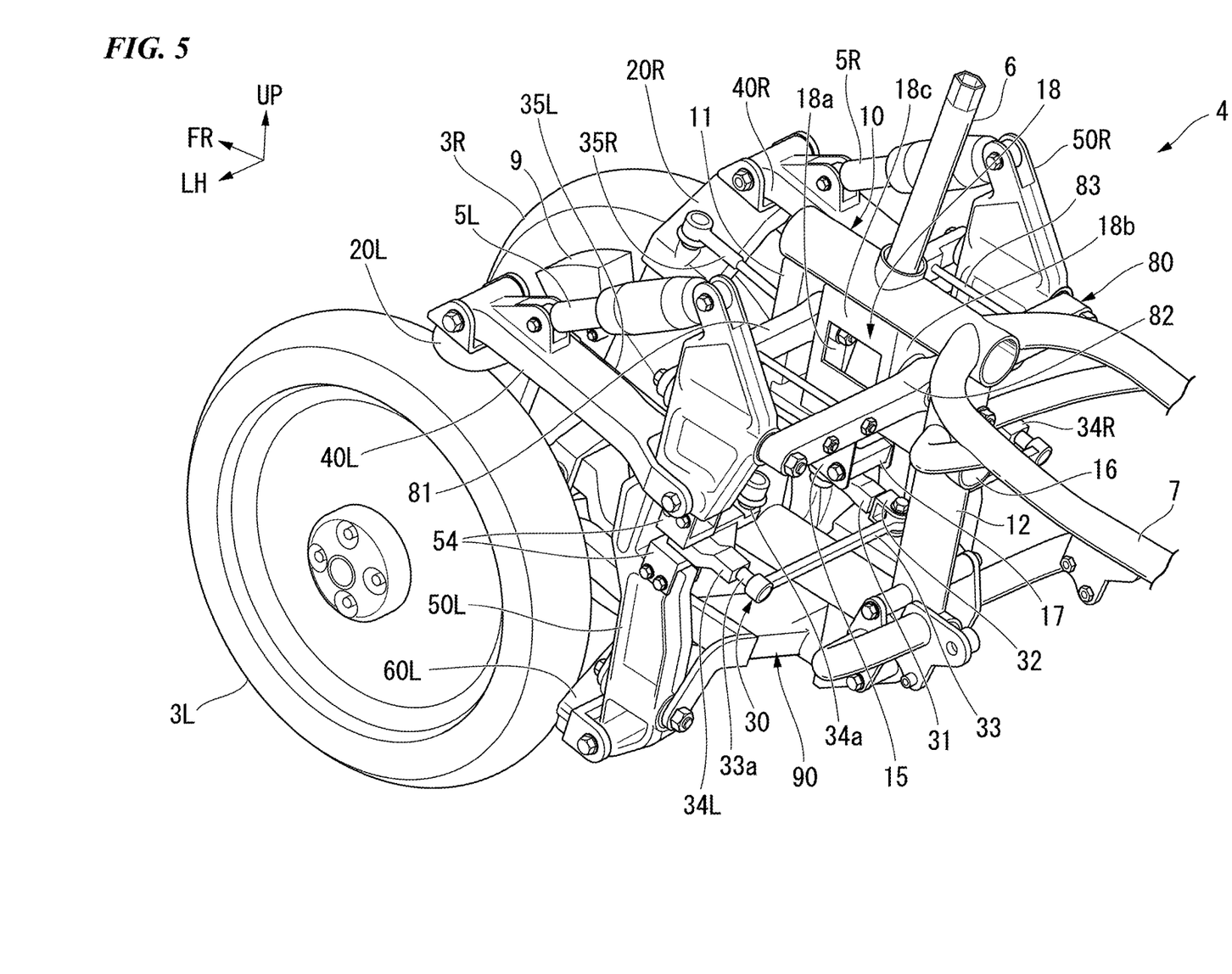
FIG. 5 is a perspective view of the front two-wheel suspension system when viewed from the upper left rear side.

As illustrated in FIG. 5, the rear side part 12 has a cylindrical shape. As illustrated in FIG. 1, the front side part 11 is vertically coupled between front ends of the upper and lower side parts 13 and 14. The rear side part 12 is vertically coupled between rear ends of the upper and lower side parts 13 and 14. A front-rear interval between the front and rear side parts 11 and 12 is sized to be able to house the upper oscillation arm 80 and to allow pivoting of the steering link mechanism 30 in the yaw direction (hereinafter referred to as "yawing motion").

In the side view of FIG. 1, the upper and lower side parts 13 and 14 extend in a rectilinear shape that is inclined with respect to the forward/backward direction such that rear sides thereof are located at a lower side, and are separated up and down substantially in parallel to each other.

As illustrated in FIG. 4, each of the upper and lower side parts 13 and 14 has a cylindrical shape.

In the side view of FIG. 1, the front and rear intermediate parts 15 and 16 are inclined with respect to the forward/backward direction such that rear sides thereof are located at a lower side, and extend back and forth. A front end of the front intermediate part 15 is coupled to a vertical intermediate portion of the front side part 11. A rear portion of the rear intermediate part 16 is coupled to a vertical intermediate portion of the rear side part 12 and a portion that is located slightly above the front intermediate part 15. As illustrated in FIG. 5, a rear portion of the front intermediate part 15 opens in the upward/downward direction and backward. The rear intermediate part 16 has a cylindrical shape.

As illustrated in FIG. 1, the upper side part 13 and the rear intermediate part 16 are separated up and down substantially in parallel to each other. A vertical interval between the upper side part 13 and the rear intermediate part 16 is sized to be able to house the upper oscillation arm 80 and to allow a rolling motion of the upper oscillation arm 80.

The front intermediate part 15 and the lower side part 14 are separated up and down. A vertical interval between the front intermediate part 15 and the lower side part 14 is sized to allow a rolling motion of the steering link mechanism 30. A vertical interval between the front intermediate part 15 and the lower side part 14 is greater than that between the upper side part 13 and the rear intermediate part 16.

As illustrated in FIG. 4, a shaft insertion part 13a into which a lower portion of the steering shaft 6 is inserted is provided at a front-rear intermediate position of the upper side part 13. The shaft insertion part 13a has a cylindrical shape whose diameter is larger than that of the steering shaft 6.

As illustrated in FIG. 5, a shaft support 17 that supports a lower portion of the steering shaft 6 to be pivotable about the steering axis C2 (see FIG. 1) is provided at the front intermediate part 15. The shaft support 17 is fixed to the front intermediate part 15 by fastening members such as bolts. The steering shaft 6 passes through the shaft support 17 and protrudes downward. A lower end of the steering shaft 6 and a rear portion (particularly, a steering arm 31 or the like) of the steering link mechanism 30 are disposed between the front side part 11 and the rear side part 12 and in a space between the front intermediate part 15 and the lower side part 14.

An upper oscillation arm support 18 that supports the middle of the upper oscillation arm 80 in the vehicle width direction to enable a rolling motion is provided between the front and the rear of the front side part 11 and the rear side part 12 and between the top and the bottom of the upper side part 13 and the front intermediate part 15. The upper oscillation arm support 18 has a box shape that has a front wall part 18a that pivotably supports the middle of a front arm 81 (hereinafter referred to as "upper oscillation front arm 81") of the upper oscillation arm 80 in the vehicle width direction, a rear wall part 18b that pivotably supports the middle of a rear arm 82 (hereinafter referred to as "upper oscillation rear arm 82") of the upper oscillation arm 80 in the vehicle width direction, and left and right sidewall parts 18c that are coupled between the front and the rear of ends of the front and rear wall parts 18a and 18b in the vehicle width direction. An upper end of the upper oscillation arm support 18 is coupled to the upper side part 13. A lower end of the upper oscillation arm support 18 is coupled to the front and rear intermediate parts 15 and 16. The steering shaft 6 is inserted into an internal space of the upper oscillation arm support 18.

As illustrated in FIG. 4, a lower oscillation arm support 19 that supports the middle of the lower oscillation arm 90 in the vehicle width direction to enable a rolling motion is provided at the lower side part 14. The lower oscillation arm support 19 includes a front extension part 19a that vertically extends on a lower extension of the front side part 11 in the front of the lower oscillation arm 90, and a rear extension part 19b that vertically extends away from the front extension part 19a back and forth in the rear of the lower oscillation arm 90.

An upper end of the front extension part 19a is coupled to the front end of the lower side part 14. An upper end of the rear extension part 19b is coupled to the rear portion of the lower side part 14. The middle of the lower oscillation arm 90 in the vehicle width direction is pivotably supported at lower portions of the front and rear extension parts 19a and 19b. A vertical length between the front and rear extension parts 19a and 19b is sized to allow a rolling motion of the lower oscillation arm 90.

A front-rear interval between the front and rear extension parts 19a and 19b is sized to be able to house the lower oscillation arm 90.

<Knuckle Arms (First Link Members)>

As illustrated in FIG. 1, the knuckle arms 20 roughly vertically extend from upper sides of the front wheels 3 to inner sides of the front wheels 3 in the vehicle width direction. As illustrated in FIG. 4, the left and right knuckle arms 20L and 20R include upper coupling parts 22 that are coupled to the upper arms 40 via first pivots 21 or the like (see FIG. 3), tie rod front coupling parts 23 which obliquely extend from the upper coupling parts 22 to be located further downward toward inner sides thereof in the vehicle width direction and to which a front end of the steering link mechanism 30 (particularly front ends of left and right tie rods 35L and 35R) is pivotably coupled via spherical bearings 23a, axle supports 24 to which steering axles 74 are coupled and which rotatably support hubs 3b (see FIG. 3) of the front wheels 3 via axles 3a, and vertical extension parts 25 that vertically extend to couple the tie rod front coupling parts 23 and the axle supports 24.

As illustrated in FIG. 3, the first pivots 21 make the knuckle arms 20 and the upper arms 40 pivotable in the yaw direction. In the side view of FIG. 3, axes C3 (hereinafter referred to as "first pivot axes C3") of the first pivots 21 are inclined with respect to the upward/downward direction such that upper sides thereof are located at a rear side. The first pivots 21 are parallel with the steering shaft 6. Upper brackets 26 are mounted at upper ends of the first pivots 21.

As illustrated in FIG. 4, the upper brackets 26 are plate members having a U shape that opens upward. The upper brackets 26 include bottom walls to which the upper ends of the first pivots 21 are fixed, and a pair of sidewalls that protrude upward from opposite ends of the bottom walls in the vehicle width direction and hold front ends of the upper arms 40 from the inside and outside in the vehicle width direction.

As illustrated in FIG. 3, heads of the first pivots 21 are coupled to the bottom walls of the upper brackets 26. For example, the first pivots 21 are weld bolts in which welding parts of the heads are coupled to the bottom walls of the upper brackets 26 by welding. Lower ends of shaft portions of the first pivots 21 protrude below the upper coupling parts 22. The lower ends of the shaft portions of the first pivots 21 are screwed to nuts 27.

The upper coupling parts 22 of the knuckle arms 20 are supported at vertical intermediate portions of the first pivots 21 to be pivotable about the first pivot axes C3. The upper coupling parts 22 are supported on the first pivots 21 via bearings 28 such as ball bearings, each of which supports a combined load including a radial load and a thrust load. The bearings 28 are fixed to the upper coupling parts 22 in directions along the first pivot axes C3 by collars 29 or the like that are fitted to stepped inner surfaces of the upper coupling parts 22 and into the upper coupling parts 22.

Seals (not shown) for securing sealability between inner circumferences of the upper coupling parts 22 and outer circumferences of the first pivots 21 are mounted in upper and lower openings of the upper coupling parts 22.

As illustrated in FIG. 4, the vertical extension parts 25 vertically extend in a crank shape to vertically couple the tie rod front coupling parts 23 and the axle supports 24. The vertical extension parts 25 include vertical extension part main bodies 25a having L shapes that extend downward from the tie rod front coupling parts 23 and then extend to be bent outward in the vehicle width direction, front extension wall parts 25b that extend downward from front ends of outer ends of the vertical extension part main bodies 25a in the vehicle width direction and are linked to upper front portions of the axle supports 24, and rear extension wall parts 25c that extend downward from rear ends of the outer ends of the vertical extension part main bodies 25a in the vehicle width direction and are linked to upper rear portions of the axle supports 24.

Openings 25h (see FIG. 3) defined by the vertical extension part main bodies 25a, the front and rear extension wall parts 25b and 25c, and the axle supports 24 are formed in the knuckle arms 20. In the side view of FIG. 3, the openings 25h have oblong shapes that have straight sides in the forward/backward direction (particularly inclined with respect to the forward/backward direction to be located further downward toward rear sides thereof). The openings 25h are sized to be able to house the upper coupling arms 72 of the leading arms 70 and to allow a yawing motion of the upper coupling arms 72.

As illustrated in FIG. 4, notches 25d recessed inwardly in the vehicle width direction to be open on upper extensions of the steering axles 74 are formed in outer ends of the vertical extension part main bodies 25a of the knuckle arms 20 in the vehicle width direction. Thereby, since a tool is easily accessed toward each steering axle 74, workability can be improved. Regulating members for regulating steering angles of the front wheels 3 may be provided between the front and rear extension wall parts 25b and 25c of the knuckle arms 20 and the upper coupling arms 72 of the leading arms 70.

<Leading Arms>

As illustrated in FIG. 4, left and right leading arms 70L and 70R have portal shapes that open outward in the vehicle width direction. The left and right leading arms 70L and 70R include lower arm front supports 71 that support front ends of the lower arms 60 to enable oscillation in the pitch direction (hereinafter referred to as "pitching motion"), and a pair of upper and lower coupling arms (an upper coupling arm 72 and a lower coupling arm 73) that extend outward from the lower arm front supports 71 in the vehicle width direction.

As illustrated in FIG. 3, outer ends 72a of the upper coupling arms 72 in the vehicle width direction are disposed in the openings 25h. The outer ends 72a of the upper coupling arms 72 in the vehicle width direction are pivotably supported on the axle supports 24 via the steering axles 74 (hereinafter referred to as "upper kingpin axles 74") that are pivoted in the yaw direction by the steering shaft 6. The upper kingpin axles 74 are offset from the left-right center line CL (see FIG. 2) of the vehicle body at equal distances left and right and are disposed left and right. The upper kingpin axles 74 support the front wheels 3 from above via the axle supports 24 or the like.

In the side view of FIG. 3, axes C4 (hereinafter referred to as "upper kingpin axle axes C4") of the upper kingpin axles 74 are inclined with respect to the upward/downward direction such that upper sides thereof are located at a rear side. The outer ends 72a of the upper coupling arms 72 in the vehicle width direction are supported on the upper kingpin axles 74 to be pivotable about the upper kingpin axle axes C4. Lower ends of the upper kingpin axles 74 protrude below the outer ends 72a of the upper coupling arms 72 in the vehicle width direction, and are coupled to upper portions of the axle supports 24. That is, the axle supports 24 of the knuckle arms 20 are fixedly coupled to the upper kingpin axles 74.

The upper kingpin axles 74 are parallel with the steering shaft 6. The upper kingpin axles 74 and the first pivots 21 are coaxial. In other words, the upper kingpin axle axes C4 and the first pivot axes C3 are disposed on the same virtual straight line.

The outer ends 72a (hereinafter referred to as "upper kingpin axle supports 72a") of the upper coupling arms 72 in the vehicle width direction are supported on the upper kingpin axles 74 via bearings 75 such as ball bearings, each of which supports a combined load including a radial load and a thrust load. The bearings 75 are fixed to the upper kingpin axle supports 72a in directions along the upper kingpin axle axes C4 by collars (not shown) or the like that are fitted to stepped inner surfaces of the upper kingpin axle supports 72a and into the upper kingpin axle supports 72a. Seals (not shown) for securing sealability between inner and outer circumferences of the upper kingpin axle supports 72a and the upper kingpin axles 74 are mounted in upper openings of the upper kingpin axle supports 72a.

Here, FIG. 3 includes a cross section in a virtual plane K (hereinafter referred to simply as "virtual plane K") that is parallel with a plane including the left-right center line CL (see FIG. 2) and a vertical line of the vehicle body and that passes each of the centers of the front wheels 3 in the vehicle width direction. The centers of the front wheels 3 in the vehicle width direction are centers P1 (see FIG. 2) of tread surfaces having circular arc section sections in tires of the front wheels 3. As illustrated in FIG. 3, the upper kingpin axle axes C4 and the stroke axes C1 are disposed on the same virtual planes K. The centers P1 (see FIG. 2) of the tread surfaces of the front wheels 3 are disposed on the same virtual planes K as the upper kingpin axle axes C4 and the stroke axes C1.

In the side view of FIG. 3, an intersection T2 with a road surface S of a downward extension portion of each upper kingpin axle axis C4 is located in front of a ground contact point T1 at a lower side perpendicular to an axis C5 of each front wheel 3 and generates a trail. An angle that is inclined with respect to a vertical line of each upper kingpin axle axis C4 in the side view of FIG. 3 is a caster angle. In the side view of FIG. 3, the axles 3a of the front wheels 3 are disposed on the upper kingpin axle axes C4.

Outer ends 73a of the lower coupling arms 73 in the vehicle width direction are pivotably supported on the axle supports 24 via lower kingpin axles 76 that are pivoted in the yaw direction by the steering shaft 6. The lower kingpin axles 76 are offset from the left-right center line CL (see FIG. 2) of the vehicle body at equal distances left and right, and are disposed left and right. The lower kingpin axles 76 support the front wheels 3 from below via the axle supports 24 or the like.

In the side view of FIG. 3, axes C6 (hereinafter referred to as "lower kingpin axle axes C6") of the lower kingpin axles 76 are inclined with respect to the upward/downward direction such that upper sides thereof are located at a rear side. The outer ends 73a of the lower coupling arms 73 in the vehicle width direction are supported on the lower kingpin axles 76 to be pivotable about the lower kingpin axle axes C6. Upper ends of the lower kingpin axles 76 protrude above the outer ends 73a of the lower coupling arms 73 in the vehicle width direction, and are coupled to lower portions of the axle supports 24. That is, the axle supports 24 of the knuckle arms 20 are fixedly coupled to the lower kingpin axles 76.

The lower kingpin axles 76 are parallel with the steering shaft 6. The lower kingpin axles 76 and the first pivots 21 are coaxial. In other words, the lower kingpin axle axes C6 and the first pivot axes C3 are disposed on the same virtual straight line. The lower kingpin axle axes C6 and the stroke axes C1 are disposed on the same virtual planes K. That is, the lower kingpin axles 76 and the upper kingpin axles 74 are coaxial.

The outer ends 73a (hereinafter referred to as "lower kingpin axle supports 73a") of the lower coupling arms 73 in the vehicle width direction are supported on the lower kingpin axles 76 via bearings 77 such as ball bearings, each of which supports a combined load including a radial load and a thrust load. The bearings 77 are fixed to the lower kingpin axle supports 73a in directions along the lower kingpin axle axes C6 by collars (not shown) or the like that are fitted to stepped inner surfaces of the lower kingpin axle supports 73a and into the lower kingpin axle supports 73a. Seals (not shown) for securing sealability between inner circumferences of the lower kingpin axle supports 73a and outer circumferences of the lower kingpin axles 76 are mounted in lower openings of the lower kingpin axle supports 73a.

Wheels 3c of the front wheels 3 are fastened and fixed outside the hubs 3b by a plurality of fasteners 3d (see FIG. 1). A brake rotor 8 is supported on an outer circumference of each hub 3b to be rotatable integrally with each hub 3b. The brake rotor 8 constitutes a front brake along with a caliper 9 that is supported on a caliper support (not shown).

<Steering Link Mechanism>

As illustrated in FIG. 5, the steering link mechanism 30 has a steering arm 31 which extends back and forth and a front end of which is fixed to the lower end of the steering shaft 6, a rear bracket 32 that is coupled to a rear end of the steering arm 31 via a bearing (not shown) such as a ball bearing to enable a rolling motion, a link rod 33 that extends in the vehicle width direction and is fixed to the rear bracket 32 in the middle thereof in the vehicle width direction, first extension parts that extend in the vehicle width direction, and second extension parts that extend backward from outer ends of the first extension parts in the vehicle width direction in a crank shape. The steering link mechanism 30 includes a pair of left and right side brackets 34L and 34R in which rear ends of the second extension parts are pivotably coupled to outer ends of the link rod 33 in the vehicle width direction via spherical bearings 33a, and a pair of left and right tie rods 35L and 35R which extend back and forth and in which rear ends of the left and right side brackets 34 are pivotably coupled to inner ends of the first extension parts in the vehicle width direction via spherical bearings 34a.

In the side view of FIG. 1, the tie rods 35 are inclined with respect to the forward/backward direction such that rear sides thereof are located at a lower side. As illustrated in FIG. 4, front ends of the left and right tie rods 35L and 35R are pivotably coupled to the tie rod front coupling parts 23 of the left and right knuckle arms 20L and 20R via the spherical bearings 23a. As illustrated in FIG. 5, pivoting of the steering handle (not shown) and turning of the left and right front wheels 3L and 3R are coordinated via the steering shaft 6, the steering arm 31, the rear bracket 32, the link rod 33, the left and right side brackets 34L and 34R, the left and right tie rods 35L and 35R, and the left and right knuckle arms 20L and 20R.

<Upper Arms (Second Link Members)>

As illustrated in FIG. 4, the left and right upper arms 40L and 40R extend back and forth at left and right sides of the front suspension frame body 10. In the side view of FIG. 1, the upper arms 40 are inclined with respect to the forward/backward direction such that rear sides thereof are located at a lower side. In the side view of FIG. 1, the upper arms 40 are parallel with the tie rods 35.

As illustrated in FIG. 3, each upper arm 40 includes an upper arm main body 41 that extends back and forth, and a cushion front support 42 that protrudes upward from an upper front portion of the upper arm main body 41. The upper arm main body 41 and the cushion front support 42 are integrally formed of the same material.

In the top view of FIG. 2, the upper arm main body 41 extends back and forth in a rectilinear shape. As illustrated in FIG. 3, a front end of the upper arm main body 41 is pivotably supported on the upper bracket 26 via an upper front pivot 44 extending in the vehicle width direction and a bearing (not shown) such as a ball bearing. In other words, the front end of the upper arm main body 41 is configured to be pivotable about an axis C7 (hereinafter referred to as "upper front pivot axis C7") of the upper front pivot 44. That is, the front end of the upper arm main body 41 is configured to allow a pitching motion by the upper front pivot 44.

A rear end of the upper arm main body 41 branches off to switch each side arm 50 from inner and outer sides thereof in the vehicle width direction and extends backward. A rear end of each upper arm 40 is pivotably supported on each side arm 50 via each of second pivots 45 (hereinafter referred to as "upper rear pivots 45") extending in the vehicle width direction and a bearing (not shown) such as a ball bearing. In other words, the rear ends of the upper arm main bodies 41 are configured to be pivotable about axes C8 (hereinafter referred to as "upper rear pivot axes C8") of the upper rear pivots 45, which are parallel with the upper front pivot axes C7. That is, the rear ends of the upper arm main bodies 41 are configured to allow a pitching motion by the upper rear pivots 45. As illustrated in FIG. 3, the upper kingpin axle axes C4, the stroke axes C1, and the upper rear pivot axes C8 are disposed on the same virtual planes K.

<Lower Arms>

As illustrated in FIG. 4, the left and right lower arms 60L and 60R extend back and forth below the left and right upper arms 40L and 40R. In the side view of FIG. 1, the lower arms 60 are inclined with respect to the forward/backward direction such that rear sides thereof are located at a lower side. In the side view of FIG. 1, the lower arms 60 are parallel with the upper arms 40.

In the top view of FIG. 2, the left and right lower arms 60L and 60R are bent such that portions facing the tires of the left and right front wheels 3L and 3R are recessed inside in the vehicle width direction. To be specific, in the top view of FIG. 2, the left and right lower arms 60L and 60R have outlines in which they obliquely extend from front ends thereof toward rear sides thereof to be located inside in the vehicle width direction, and then is bent at the rear sides thereof to extend in a rectilinear shape and, afterward they obliquely extend toward the rear sides thereof to be located outside in the vehicle width direction, and reach the rear ends thereof. That is, the left and right lower arms 60L and 60R include bent parts 60a to prevent turning loci of the front wheels 3.

The front ends of the left and right lower arms 60L and 60L are pivotably supported on lower arm front supports 71 of the left and right leading arms 70L and 70R via lower front pivots 61 extending in the vehicle width direction and bearings (not shown) such as ball bearings. In other words, as illustrated in FIG. 1, the front ends of the lower arms 60 are configured to be pivotable about axes C9 (hereinafter referred to as "lower front pivot axes C9") of the lower front pivots 61 (see FIG. 2). That is, the front ends of the lower arms 60 are configured to allow a pitching motion by the lower front pivots 61 (see FIG. 2). In the side view of FIG. 1, the lower front pivot axes C9 are disposed on the same virtual straight lines as the axes C5 of the front wheels 3 (see FIG. 3).

As illustrated in FIG. 2, the rear ends of the left and right lower arms 60L and 60R are pivotably supported on lower ends of the left and right side arms 50L and 50R via lower rear pivots 62 extending in the vehicle width direction and bearings (not shown) such as ball bearings. In other words, as illustrated in FIG. 1, the rear ends of the lower arms 60 are configured to be pivotable about axes C10 (hereinafter referred to as "lower rear pivot axes C10") of the lower rear pivots 62, which are parallel with the lower front pivot axes C9. That is, the rear ends of the lower arms 60 are configured to allow a pitching motion by the lower rear pivots 62.

<Side Arms (Third Link Members)>

As illustrated in FIG. 4, the left and right side arms 50L and 50R vertically extend at the left and right sides of the front suspension frame body 10. In the side view of FIG. 1, the side arms 50 are inclined with respect to the upward/downward direction such that upper sides thereof are located at a rear side.

As illustrated in FIG. 4, the left and right side arms 50L and 50R include side arm main bodies 51 that extend vertically, and cushion rear supports 52 that protrude from upper ends of the side arm main bodies 51 toward upper front sides thereof. The side arm main bodies 51 and the cushion rear supports 52 are integrally formed of the same member.

In the side view of FIG. 3, vertical intermediate portions of the side arm main bodies 51 are cut out such that portions facing the side brackets 34 of the steering link mechanism 30 are recessed forward. That is, runout concaves of the side brackets 34 when the front wheels 3 are turned are formed in the vertical intermediate portions of the side arm main bodies 51.

A pair of upper and lower holding members 54 are provided at forming parts 51a for the runout concaves in the side arm main body 51 (hereinafter referred to as "runout concave forming parts 51a") to sandwich the side brackets 34 from above and below. To be specific, the upper and lower holding members 54 are disposed to sandwich the outer ends of the first extension parts in the vehicle width direction and front ends of the second extension parts in the side brackets 34 from above and below.

The upper and lower holding members 54 support the side brackets 34 from above and below to allow a yawing motion (sliding) of the side brackets 34.

Rear ends of the upper arms 40 are pivotably supported at the vertical intermediate portions of the side arm main bodies 51 and at upper portions of the upper holding members 54 via the upper rear pivots 45. On the other hand, rear ends of the lower arms 60 are pivotably supported at lower ends of the side arm main bodies 51 via the lower rear pivots 62.

Outer ends 80a of the upper oscillation arm 80 in the vehicle width direction are pivotably supported at upper portions of the side arm main bodies 51 and at portions 55 (hereinafter referred to as "side upper pivot supports 55") between the cushion rear supports 52 and the upper rear pivots 45 via third pivots 56 (hereinafter referred to as "side upper pivots 56"). In the side view of FIG. 3, axes C11 (hereinafter referred to as "side upper pivot axes C11") of the side upper pivots 56 are inclined with respect to the forward/backward direction such that rear sides thereof are located at a lower side. The side upper pivot supports 80a are configured to be pivotable about the side upper pivot axes C11. That is, the side upper pivot supports 80a are configured to allow a rolling motion by the side upper pivots 56.

Outer ends 90a of the lower oscillation arm 90 in the vehicle width direction are pivotably supported at lower portions of the side arm main bodies 51 and at portions 57 (hereinafter referred to as "side lower pivot supports 57") between the lower holding members 54 and the lower rear pivots via side lower pivots 58. In the side view of FIG. 3, axes C12 (hereinafter referred to as "side lower pivot axes C12") of the side lower pivots 58 are inclined with respect to the forward/backward direction such that rear sides thereof are located at a lower side. The side lower pivot axes C12 are parallel with the side upper pivot axes C11. The side lower pivot supports 90a are configured to be pivotable about the side lower pivot axes C12. That is, the side lower pivot supports 90a are configured to allow a rolling motion by the side lower pivots 58.

In the side view of FIG. 1, straight lines C21 connecting the upper rear pivot axes C8 and the lower rear pivot axes C10 are inclined with respect to the forward/backward direction such that upper sides thereof are located at a rear side. The straight lines C21 are parallel with the upper kingpin axle axes C4 (see FIG. 3) by which the caster angles are set. In other words, the straight lines C21 are parallel with the steering axis C2. Thereby, even when the cushion units 5 are moved by shock input into the front wheels 3 or the like, the caster angles can be constantly maintained.

<Upper Oscillation Arm (Oscillation Arm)>

As illustrated in FIG. 2, the upper oscillation arm 80 is formed in a ladder shape that has straight sides in the vehicle width direction. The upper oscillation arm 80 is disposed to sandwich the steering shaft 6 between the front and the rear thereof. As illustrated in FIG. 4, the upper oscillation arm 80 includes an upper oscillation front arm 81 that extends in front of the steering shaft 6 in the vehicle width direction, an upper oscillation rear arm 82 that extends in the rear of the steering shaft 6 in the vehicle width direction, and a plurality of coupling members 83 that are coupled between the front and the rear of the upper oscillation front arm 81 and the upper oscillation rear arm 82.

The upper oscillation front arm 81 is disposed between the front and the rear of the front side part 11 of the front suspension frame body 10 and the front wall part 18a of the upper oscillation arm support 18. The middle of the upper oscillation front arm 81 in the vehicle width direction is pivotably supported at the front side part 11 of the front suspension frame body 10 and the front wall part 18a of the upper oscillation arm support 18 via coupling members such as bolts and bearings (not shown) such as ball bearings.

As illustrated in FIG. 5, the upper oscillation rear arm 82 is disposed between the front and the rear of the rear wall part 18b of the upper oscillation arm support 18 and the rear side part 12 of the front suspension frame body 10. The middle of the upper oscillation rear arm 82 in the vehicle width direction is pivotably supported at the rear wall part 18b of the upper oscillation arm support 18 and the rear side part 12 of the front suspension frame body 10 via coupling members such as bolts and bearings (not shown) such as ball bearings. As illustrated in FIG. 2, the upper oscillation front arm 81 and the upper oscillation rear arm 82 are parallel. The upper oscillation front arm 81 and the upper oscillation rear arm 82 are identical in longitudinal length (i.e., arm length).

In the embodiment, four coupling members 83 are coupled between the front and the rear of the upper oscillation front arm 81 and the upper oscillation rear arm 82. In the top view of FIG. 2, the coupling members 83 extend back and forth in a rectilinear shape to be across between the front and the rear of the upper oscillation front arm 81 and the upper oscillation rear arm 82. The coupling members 83 include bolts that are inserted into through-holes (not shown) of the upper oscillation front arm 81 and the upper oscillation rear arm 82 and cause rear ends of shaft parts thereof to protrude backward the upper oscillation rear arm 82, and nuts that are screwed to the rear ends of the shaft parts of the bolts.

As illustrated in FIG. 3, outer ends 80a (hereinafter referred to as "side upper pivot supports 80a") of the upper oscillation arm 80 in the vehicle width direction are supported on the side upper pivots 56 via bearings 84 such as ball bearings, each of which supports a combined load including a radial load and a thrust load.

The bearings 84 are fixed to side upper pivot supports 55 in directions along the side upper pivot axes C11 by collars 85 or the like that are fitted to stepped inner surfaces of the side upper pivot supports 55 and into the side upper pivot supports 55. The side upper pivot axes C11 are disposed on the same virtual planes K as the upper kingpin axle axes C4 and the stroke axes C1.

<Lower Oscillation Arm>

As illustrated in FIG. 2, the lower oscillation arm 90 extends below the upper oscillation arm 80 in the vehicle width direction. As illustrated in FIG. 4, the middle of the lower oscillation arm 90 in the vehicle width direction is pivotably supported at lower portions of front and rear extension parts 19a and 19b via coupling members such as bolts and bearings (not shown) such as ball bearings.

The lower oscillation arm 90 obliquely extends from the middle thereof in the vehicle width direction toward the outside thereof in the vehicle width direction to be located at an upper side thereof, and then is bent to be located at a lower side thereof to extend toward the outside thereof in the vehicle width direction. Outer ends of the lower oscillation arm 90 in the vehicle width direction branch off to sandwich the side arms 50 from back and forth, and obliquely extend toward the outside thereof in the vehicle width direction to be located from lower sides thereof.

As illustrated in FIG. 3, the outer ends 90a (hereinafter referred to as "side lower pivot supports 90a") of the lower oscillation arm 90 in the vehicle width direction are supported on the side lower pivots 58 via bearings 91 such as ball bearings, each of which supports a combined load including a radial load and a thrust load.

The bearings 91 are fixed to side lower pivot supports 57 in directions along the side lower pivot axes C12 by collars 92 or the like that are fitted to stepped inner surfaces of the side lower pivot supports 57 and into the side lower pivot supports 57. The side lower pivot axes C12 are disposed on the same virtual planes K as the side upper pivot axes C11.

<Arrangement Relationship Between Components>

In the side view of FIG. 3, the upper arms 40, the lower arms 60, the knuckle arms 20, and the side arms 50 are arranged in a parallel link shape. To be specific, in the side view of FIG. 1, a straight line (a virtual line) connecting the upper rear pivot axes C8, the upper front pivot axes C7, the lower front pivot axes C9, and the lower rear pivot axes C10 forms a parallelogram. Thereby, when the left and right upper arms 40L and 40R and the left and right lower arms 60L and 60R oscillate vertically, the left and right knuckle arms 20L and 20R, the left and right leading arms 70L and 70R, the left and right front wheels 3L and 3R, and the left and right side arms 50L and 50R perform an up-and-down motion substantially in parallel.

In the side view of FIG. 3, the tie rods 35 are arranged to be parallel with and identical in length to the upper arms 40 and the lower arms 60. That is, the tie rods 35 are arranged in a parallel link shape along with the upper arms 40 and the lower arms 60. Thereby, when the left and right upper arms 40L and 40R and the left and right lower arms 60L and 60R oscillate vertically, the left and right tie rods 35L and 35R perform an up-and-down motion substantially in parallel along with the left and right upper arms 40L and 40R and the left and right lower arms 60L and 60R, and thus an influence on a steering angle for the left and right front wheels 3L and 3R can be inhibited.

As described above, in the embodiment, the front two-wheel suspension system 4 includes the pair of left and right front wheels 3, the left and right cushion units 5 that damp the external force applied to the left and right front wheels 3, and the steering shaft 6 that turnably steers the vehicle body 2, and further includes the left and right upper kingpin axles (the left and right upper steering axles) 74 that support the left and right front wheels 3 and are pivoted in the yaw direction by the steering shaft 6, the left and right knuckle arms (the left and right first link members) 20 that are coupled to the left and right upper kingpin axles 74 and are pivoted in the yaw direction by the steering shaft 6, the left and right upper arms (the left and right second link members) 40 that couple the left and right knuckle arms 20 and the left and right cushion units 5, and the left and right first pivots 21 that makes the left and right knuckle arms 20 and the left and right upper arms 40 pivotable in the yaw direction. The upper kingpin axles 74 and the first pivots 21 are coaxial.

According to this constitution, since the upper kingpin axles 74 and the first pivots 21 are coaxial, when the external force from the ground is applied to the front wheels 3, torsional moment generated between the upper kingpin axles 74 and the first pivots 21 can be inhibited. For this reason, the bearings 75 of the upper kingpin axles 74 and the bearings 28 of the first pivots 21 can be downsized compared to a case in which the upper kingpin axles 74 and the first pivots are shifted on different axes. That is, there is no need to make the bearings larger in order to enhance torsional rigidity. Therefore, the front two-wheel suspension system 4 can be downsized. In addition, since it is possible to inhibit the knuckle arms 20 from being made larger, the front two-wheel suspension system 4 is further downsized easily.

In the embodiment, the centers P1 of the tread surfaces of the front wheels 3 are arranged on the same virtual planes K as the upper kingpin axle axes C4 and the stroke axes C1. Thereby, since the external force is easily transmitted from the centers P1 of the tread surfaces of the front wheels 3 to the cushion units 5 via the upper kingpin axles 74, moments generated in the roll direction and the yaw direction can be inhibited when the external force is applied to the front wheels 3. For this reason, in comparison with a case in which the centers P1 of the tread surfaces of the front wheels 3 are arranged on planes different from the upper kingpin axle axes C4 and the stroke axes C1, the external force can be effectively damped by the cushion units 5, and the cushion units 5 can be downsized. Therefore, the front two-wheel suspension system 4 is further downsized with ease. In addition, torsional moment generated at the knuckle arms 20 can be inhibited, and thus it is possible to inhibit the knuckle arms 20 from being made larger. Therefore, the front two-wheel suspension system 4 is further downsized easily. In addition, since torsional moment generated in the pivoting directions (the pitch directions) of the upper arms 40 can be inhibited, it is possible to inhibit the upper arms 40 from being made larger. Therefore, the front two-wheel suspension system 4 is further downsized easily.

In the embodiment, the left and right upper rear pivots (the left and right second pivots) 45 that makes the left and right upper arms 40 pivotable in the pitch directions are further provided, and the upper kingpin axle axes C4 (the axes of the pivots), the stroke axes C1 (the axes of the cushion units 5), and the upper rear pivot axes C8 (the axes of the second pivots) are arranged on the same virtual planes K. Thereby, when the external force is applied to the front wheels 3, the moments generated in the roll direction and the yaw direction can be inhibited. For this reason, in comparison with a case in which the upper kingpin axle axes C4, the stroke axes C1, and the upper rear pivot axes C8 are arranged on different planes, the external force can be effectively damped by the cushion units 5, and the cushion units 5 can be downsized. Therefore, the front two-wheel suspension system 4 is further downsized easily. In addition, since the torsional moment generated in the pivoting directions (the pitch directions) of the upper arms 40 can be inhibited, it is possible to inhibit the upper arms 40 from being made larger. Therefore, the front two-wheel suspension system 4 is further downsized easily.

In the embodiment, the left and right side arms (the left and right third link members) 50 that pivotably support the left and right upper arms 40 via the left and right upper rear pivots 45, the upper oscillation arm (the oscillation arm) 80 that couples the left and right side arms 50 in the vehicle width direction, and the left and right side upper pivots (the left and right third pivots) 56 that make the left and right side arm members 50 and the outer ends 80a of the upper oscillation arm 80 in the vehicle width direction pivotable in the roll direction are further provided, and the side upper pivot axes C11 (the axes of the third pivots) are arranged on the virtual planes K. Thereby, since torsional moment in the roll direction generated at the upper oscillation arm 80 can be inhibited, the upper oscillation arm 80 can be downsized. Therefore, the front two-wheel suspension system 4 is further downsized easily.

In the embodiment, the upper kingpin axles 74 are parallel with the steering shaft 6. Thereby, since the front wheels 3 are turned with uniformity with respect to the pivoting of the steering shaft 6, operability of a vehicle can be improved. In addition, since a link absorbing an angle difference of the steering shaft 6 is not required, the front two-wheel suspension system 4 is further downsized easily.

Further, in the embodiment, the side lower pivot axes C12 are arranged on the virtual planes K. Thereby, since the torsional moment in the roll direction generated at the lower oscillation arm 90 can be inhibited, the lower oscillation arm 90 can be downsized. Therefore, the front two-wheel suspension system 4 is further downsized easily.

In the embodiment, although an example in which the centers P1 of the tread surfaces of the front wheels 3 are arranged on the same virtual planes K as the upper kingpin axle axes C4 and the stroke axes C1 has been described, the embodiment is not limited thereto. For example, the center P1 of the tread surface of the front wheel 3 may be arranged on the same virtual plane K as any one of the upper kingpin axle axis C4 and the stroke axis C1. That is, the center P1 of the tread surface of the front wheel 3 may be arranged on the same virtual plane K as at least one of the upper kingpin axle axis C4 and the stroke axis C1.

In the embodiment, although an example in which the upper oscillation arm 80 is arranged to sandwich the steering shaft 6 between the front and the rear has been described, the embodiment is not limited thereto. For example, the upper oscillation arm 80 may be arranged in front of or in the rear of the steering shaft 6.

In the embodiment, although an example in which the leading arms 70 include the upper kingpin axle supports 72a and the lower kingpin axle supports 73a has been described, the embodiment is not limited thereto. For example, as long as a required strength and rigidity are satisfied, the leading arms 70 may include any one of the upper kingpin axle supports 72a or the lower kingpin axle supports 73a. That is, the leading arms 70 may include at least one of the upper kingpin axle supports 72a and the lower kingpin axle supports 73a.

The present invention is not limited to the above embodiment, and may be not only applied to, for instance, three-wheel vehicles having left and right front wheels and a single rear wheel, but also four-wheel vehicles having left and right front wheels and left and right rear wheels.

The constitution of the embodiment is an example of the present invention, and the components of the embodiment can be replaced by known components. For example, various modifications can be made without departing from the spirit or scope of the present invention.

What is claimed is:

1. A front two-wheel suspension system, comprising:
   a pair of left and right front wheels;
   left and right cushion units configured to damp an external force applied to the pair of left and right front wheels;
   a steering shaft configured to turnably steer a vehicle body;
   left and right steering axles configured to support the pair of left and right front wheels and pivoted in a yaw direction by the steering shaft;
   left and right first link members coupled to the left and right steering axles and pivoted in the yaw direction by the steering shaft;
   left and right second link members configured to couple the left and right first link members and the left and right cushion units; and
   left and right first pivots configured to make the left and right first link members and the left and right second link members pivotable in the yaw direction,
   wherein the steering axles and the first pivots are coaxial, and
   wherein the left and right steering axles are positioned on an inner side of a wheel perimeter in a wheel radial direction, and the left and right first pivots are positioned on an outer side of the wheel perimeter in the wheel radial direction.

2. The front two-wheel suspension system according to claim 1,
   wherein the centers of tread surfaces of the front wheels are arranged on the same virtual planes as at least one of axes of the steering axles and axes of the cushion units.

3. The front two-wheel suspension system according to claim 1, further comprising
   left and right second pivots configured to make the left and right second link members pivotable in a pitch direction,
   wherein axes of the steering axles, axes of the cushion units, and axes of the second pivots are arranged on the same virtual planes.

4. The front two-wheel suspension system according to claim 2, further comprising:
   left and right third link members configured to pivotably support the left and right second link members via the left and right second pivots;
   an oscillation arm configured to couple the left and right third link members in a vehicle width direction; and
   left and right third pivots configured to make the left and right third link members and outer ends of the oscillation arm in the vehicle width direction pivotable in a roll direction,
   wherein axes of the third pivots are arranged on the virtual planes.

5. The front two-wheel suspension system according to claim 1,
   wherein the steering axles are parallel with the steering shaft.

* * * * *